| United States Patent Office | 2,850,236
|---|---|
| | Patented Sept. 2, 1958 |

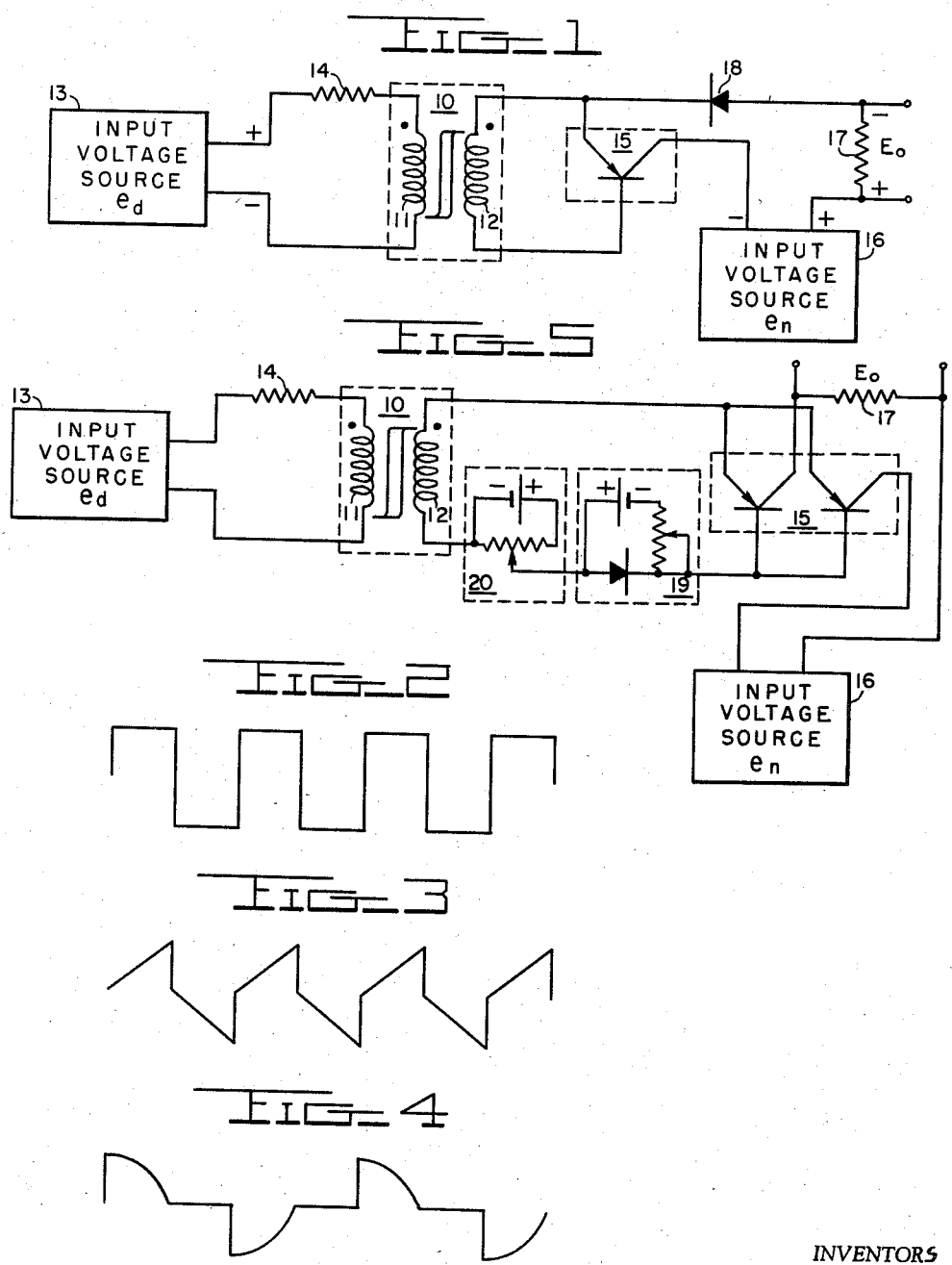

2,850,236

POLARITY SENSITIVE ANALOGUE DIVIDER

David H. Schaefer, Washington, D. C., and Donald G. Scorgie, Pittsburgh, Pa., assignors to the United States of America as represented by the Secretary of the Navy Application June 12, 1956, Serial No. 591,000

2 Claims. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

This invention relates in general to magnetic computing circuits and in particular to a polarity sensitive high speed computing means for producing an output voltage which is a quotient function of two input voltages.

The copending application of D. H. Schaefer, Serial No. 572,777, filed March 20, 1956 discloses a compact single quadrant voltage computing means for obtaining an analogue function of two input voltages. The invention described and claimed herein represents an improvement upon the single quadrant device disclosed in this copending application.

It will be appreciated that it is sometimes desirable that the computing means be capable of providing an output voltage which is an analogue function of two input voltages and is characterized by a polarity appropriate to the combination of the input voltage polarities.

Accordingly:

It is the prime object of this invention to provide a polarity sensitive computing means for producing a quotient function of two input voltages.

Other objects of the invention will become apparent upon a more comprehensive understanding of the invention for which reference is had to the attached specification and drawings.

In the drawings:

Fig. 1 is a schematic showing of the single quadrant divider described and claimed in the above mentioned copending application.

Figs. 2, 3 and 4 are graphical showings of various input voltage waveforms which might be employed with the embodiment of Fig. 5.

Fig. 5 is a schematic showing of an embodiment of the four quadrant divider of the present invention.

A rectangle is drawn between the transformer windings in Figs. 1 and 5 to indicate a core material having a substantially rectangular hysteresis characteristic.

Briefly, this invention employs a core material having a substantially rectangular hysteresis characteristic and a transistorized switching means in a core material saturation condition controlled device to produce a polarity sensitive four quadrant high speed analogue computing means. In the invention one input voltage is applied to an input winding on the core to bring the core material from one saturation level to the other. By the connection of the transistorized switching means to a second winding on the core, means are provided for applying a second input voltage across the load impedance during the time interval required to bring the core from one saturation level to the other. Thus, the device provides a pulsed output wherein each output pulse is characterized by a magnitude instantaneously proportional to the magnitude of one input voltage and a width bearing some functional relationship to the magnitude of the other input voltage. Therefore, the average output voltage represents an analogue function of the two input voltages. A principal utility of the device is to provide an average output voltage proportional to the quotient of the two input voltages.

Referring now to the drawings:

Fig. 1 depicts a simplified embodiment of a single quadrant divider which is demonstrative of the basic principle of operation of the present invention. In the embodiment of Fig. 1 a magnetic core material having a substantially rectangular hysteresis characteristic is utilized for the transformer 10. The first input voltage $e_d$ is applied across the input winding of the transformer and the second input voltage $e_n$ is applied across a load impedance 17 by means of the switching means 15, which operates in accordance with the saturation condition of the transformer core material.

The function of the various component parts of the single quadrant divider shown in Fig. 1 will be explained in conjunction with the discussion of the embodiment of the present invention shown in Fig. 5, respective component parts of Figs. 1 and 5 being identified by the same numeral.

Fig. 5 depicts an embodiment of the four quadrant divider of this invention. In this embodiment, as in the single quadrant divider of Fig. 1, a magnetic core material having a substantially rectangular hysteresis characteristic is utilized for the transformer 10. A voltage source 13, which provides an alternating voltage $e_d$ of significant magnitude, is connected via the impedance 14 across the input winding 11 of transformer 10. The primary function of voltage source 13 is to bring the core material of transformer 10 from one saturation level to the other and it is an essential requirement of this invention that the alternating voltage output of voltage source 13 be of sufficient magnitude to accomplish this status transversal from one saturation level to the other.

It will be seen that the impedance 14 is not essential to the invention. This current limiting impedance is provided merely to prevent a short circuit of the voltage source 13 once the saturation level of the core material is reached and the impedance of winding 11 drops to a minimum value.

The winding 12 of transformer 10, having the dot indicated phase relation to the input winding 11, is connected to a voltage sensitive switching means 15 which is operative to connect the output voltage $e_n$ of voltage source 16 across the load impedance 17. The switching means 15 is sensitive to the magnitude and polarity of the voltage across the winding 12 and is so connected to complete the circuit, which applies voltage source 16 across the load impedance 17, during the time interval required to saturate the core material. Thus the switching means is closed during the saturating period but once saturation takes place, the voltage across the winding 12 drops to a minimum and opens the switch.

In the exemplary embodiment of Fig. 5, PNP type transistors are shown connected as the switching means 15. While other types of voltage sensitive means might be employed it has been found that transistor switching means are particularly adaptable to the present invention and afford considerable advantage thereto.

In basic explanation of the operation of a PNP type transistor as a switching element, the collector to emitter impedance of such transistors becomes very high when both the collector and emitter voltages are equal to or more negative than the base voltage. As soon as the base becomes slightly negative with respect to either collector or emitter, however, the emitter-collector impedance drops to the vicinity of one ohm.

In Fig. 5, the emitter and base of each of the transistors in switching means 15 are connected across the winding 12. Thus, when the dotted end of winding 12 is positive with respect to the undotted end of the winding, the transistors each will be in the conducting state. Likewise if the dotted end of the winding 12 is negative with respect to the undotted end, or if there is no voltage differential across the winding, the transistors will both be in the non-conducting state. By the connection of the collectors of the transistors across the input voltage source 16 and load impedance 17 in series, means are provided such that the $e_n$ may be blocked on both its positive and negative half cycles. Thus if the input voltages $e_n$ and $e_d$ are similar in periodicity and in phase, the switching means will permit the voltage $e_n$ to appear across the load impedance 17 only during positive half cycles of $e_n$ and the output voltage $e_o$ will be positive. On the other hand, if the same input voltages $e_n$ and $e_d$ are 180 degrees out of phase, the switching means will permit the voltage $e_n$ to appear across the load impedance 17 only during negative half cycles of $e_n$. As a practical example, if $e_d$ and $e_n$ are outputs from two ring modulators with the same A. C. supply, the embodiment of this invention as shown in Fig. 5 will give the quotient, $e_n/e_d$, with the proper sign, of the D. C. inputs to the ring modulators.

In mathematical analysis of the core saturation phase of the invention, the following integral is expressive of the observed energy-time requirement for bringing the core material from one saturation level to the other:

$$\int_0^{t_s} e_d \, dt = K \qquad (1)$$

where $e_d$ is considered the alternating voltage input applied to the input winding 11, the limit $t_s$ is the time required to bring the core material from one saturation level to the other, K is a characteristic constant for a given core measured in volt-seconds, and time is measured from the beginning of a half cycle of the alternating voltage $e_d$.

In similar mathematical analysis of the output circuitry, the following integral is expressive of the output voltage $e_o$, which is the average voltage across the load impedance;

$$\int_0^{t_s} e_n \, dt = e_o \qquad (2)$$

where $e_n$ is the output waveform of voltage source 16, and again $t_s$ is the time required to bring the core material from one saturation level to the other.

In this invention the input voltages $e_d$ and $e_n$ may have any desired waveform. However, in its principal utility, as a simple divider, it will be appreciated that the device of this invention should have input voltages of substantially similar waveform and phase.

To simplify the mathematical analysis which follows, the input voltages $e_d$ and $e_n$ will first be considered as square waves, as shown in Fig. 2.

In accordance therewith, it will be seen that Equation 1 reduces to $$e_d t_s = K \qquad (3)$$

or $$t_s = \frac{K}{e_d} \qquad (4)$$

Likewise, Equation 2 reduces to $$e_o = e_n t_s \qquad (5)$$

substituting Equation 4, Equation 5 becomes $$e_o = e_n \frac{K}{e_d} \qquad (6)$$

Thus it will be seen that, with square input waveform voltages, the average output $e_o$ is directly proportional to the quotient of the two input voltages. It has been found that this proportion exists irrespective of the particular input waveform employed as long as both inputs have identical waveforms.

Other waveforms, such as the waveform $Et^n$ shown in Fig. 3 and the waveform $E \cos \omega t$ shown in Fig. 4, might readily be employed as either the input voltage $e_d$ or $e_n$ in this invention. In each instance, the average output, $e_o$, will be a function of the input voltage $e_n$ times some function of the input voltage $e_d$. For example, with input voltage $e_n$ having the waveform, $E \cos \omega t$, and the voltage $e_n$ having the waveform $Et^n$ $$e_o \sim e_n \left[ \arcsin \frac{K}{e_d} \right]^{n+1} \qquad (7)$$

Likewise, the input voltage $e$ having the waveform $Et_n$, and the input voltage $e_n$ having the waveform; $E \cos \omega t$, $$e_o \sim e_n \sin \frac{K}{e_d^{\frac{1}{n+1}}} \qquad (8)$$

In the earlier stated premise—the time required to saturate the core is inversely proportional to the magnitude of the applied voltage, $t_s = K/e_d$, it has been assumed that the voltage drop across the current limiting impedance 14 is negligible and that the full voltage $e_d$ is applied across the winding 11. While, in general, this assumption is reasonable, it has been found that as the denominator voltage $e_d$ is reduced, the voltage drop across the impedance 14 may introduce an observable degree of error. As a rule, this error is not of significant importance unless the voltage drop across the impedance 14 exceeds an order two orders less than that of the voltage $e_d$. Where the voltage $e_d$ is relatively small, a current limiter, for example, a biased rectifier, as shown at 19 in Fig. 5, may be employed for the purpose of maintaining the base current portion of the denominator circuit current at a constant minimum. It has also been found advisable in the embodiment of Fig. 5 to employ an auxiliary voltage source such as shown at 20 in the drawing. This voltage source serves to maintain a biasing voltage on the transistor switching means which promotes a prompt switching action. It is understood, of course, that neither the current limiting means 19 nor the bias supply 20 is essential to the basic operation of this invention and that both may be omitted where the denominator circuit current presents no problem or the promptness of the switching action is not critical.

It has been found that the embodiment exemplarily described in detail above may be ruggedly constructed in an extremely light and compact manner. In addition it has been found that this embodiment is relatively unaffected by temperature conditions. An average accuracy of $\pm 2.5\%$ has been obtained with this embodiment. It is seen that by a more discriminative selection of circuit components greater accuracy may be readily attainable.

It will be appreciated that the input voltage combinations described herein are merely exemplary of the wide variety of input waveforms which may be employed in this invention and it is clearly understood that other input voltage waveforms may be substituted as desired. In particular, it is understood that a D. C. voltage might be employed for both the input $e_d$ and the input $e_n$. Of course, where a D. C. voltage is employed as the input $e_d$, auxiliary means should be provided for periodically returning the core to its previous saturation level.

Finally, it is understood that this invention is to be limited only by the scope of the claims appended hereto.

What is claimed is:

1. An analogue computing device comprising a core material having a substantially rectangular hysteresis characteristic, first and second mutually inductive windings wound thereon, a first voltage source of sufficient magnitude to bring said core material from one saturation level to the other, means applying said first voltage source across said first winding, an output load impedance, a second voltage source connected to said load impedance, plus a switching means comprising two PNP type transistors having base and emitter connections thereof connected in parallel across said second winding such that both transistors are similarly responsive to the voltage thereacross, said transistors having their collector connections connected to said load impedance and said second voltage source, respectively, such as to apply said second voltage source across said output load impedance for the period required for said core material to be brought from one saturation level to the other by said first voltage source.

2. An analogue computing device comprising a core material having a substantially rectangular hysteresis characteristic, first and second mutually inductive windings wound thereon, a first voltage source of sufficient magnitude to bring said core material from one saturation level to the other, means applying said first voltage source across said first winding, said applying means including a current limiting means in series therewith for restricting the amount of current flow in the circuit once a saturation level is reached, an output load impedance, a second voltage source connected to said load impedance, plus a switching means comprising two PNP type transistors having base and emitter connections thereof connected in parallel across said second winding such that both transistors are similarly responsive to the voltage thereacross, said transistors having their collector connections connected to said load impedance and said second voltage source, respectively, such as to apply said second voltage source across said output load impedance for the period required for said core material to be brought from one saturation level to the other by said first voltage source.

References Cited in the file of this patent

UNITED STATES PATENTS

| | | |
|---|---|---|
| 2,768,088 | Pittman et al. | Aug. 21, 1956 |
| 2,773,132 | Bright | Dec. 4, 1956 |

OTHER REFERENCES

Trans. of the AIEE (Van Allen), Nov. 1955, pages 643–648.